3,159,538
ANTI-INFLAMMATORY THERAPEUTIC AGENT AND PROCESS

Joseph Nordmann, Paris, France, assignor, by mesne assignments, to Etablissements Kuhlmann, Paris, France, a corporation of France
No Drawing. Filed May 8, 1962, Ser. No. 193,331
3 Claims. (Cl. 167—55)

The present invention relates to a therapeutic agent having an anti-inflammatory, antiphlogistic and antirheumatic action.

It has been found that according to the present invention that the diamide of succinic acid and N-methyl-β-hydroxyethylamine, of the formula

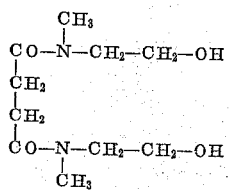

possesses anti-inflammatry, antiphlogistic and antirheumatic properties and can be advantageously used as a medicine.

In the pure state, this diamide is a white crystalline product very soluble in water (29.5% at 20° C.), is sparingly soluble in olive oil, has an instantaneous melting point of 121–122° C. on the Maquenne block, and has absorption spectrum in the infra-red which gives a particular single band between 6.1 and 6.2μ and a band at 2.8μ.

It may be prepared, for example, by reacting a succinic acid ester with excess of N-methyl-β-hydroxyethylamine. The reaction may be effected at reflux temperature without a catalyst. The succinamide of the above formula can be analytically identified by its melting point, its infra-red spectrum and its hydrolysis into succinic acid and N-methyl-β-hydroxyethylamine.

The product may be used in therapeutics, for example, in daily doses of 3 to 12 cachets or compressed tablets containing a dose of 200 to 600 mg., it can also be used in combination with other medicines.

*Example of Preparation of the Diamide of Succinic Acid and N-Methyl-β-Hydroxyethylamine*

570 parts by weight of diethyl succinate and 1000 parts by weight of N-methyl-β-hydroxyethylamine are placed in an apparatus provided with a reflux condenser and heated under reflux for 2 hours. The reflux condenser is then replaced by a column connected with an ordinary condenser and the ethyl alcohol formed during the reaction is slowly distilled off. On cooling the reaction mixture crystallises and the crystals are filtered off and thoroughly drained. About 1154 parts by weight of commercial product are obtained which melt on the Maquenne block at about 115° C. The product is purified by dissolving in about its own weight of methyl alcohol, heating the solution under reflux for 20 minutes in the presence of 20 parts by weight of active carbon filtering whilst hot, slowly cooling and filtering after crystallisation. About 630 parts by weight of pure N,N'-bis-substituted succinamide having the characteristics indicated above are obtained.

*Pharmacological Properties*

The toxicity of the N,N'-bis-substituted succinamide diamide has been investigated, but it has not been possible to obtain a lethal toxic effect of the product on mice, either taken intraperitoneally or orally, even up to large doses of 10 g./kg. On the other hand, administration of large doses of the compound sometimes causes a catatonus of the tail and the animals are generally excited. When it is administered orally to guinea pigs at a dose of 2 g./kg. for 6 days, no modification of the diureses or variation in weight is found and the autopsy on the animals does not disclose any anatomicopathological incidence on the kidneys, intestines, stomach or bladder. It is evident from these various tests that at the doses indicated the N,N'-bis-substituted succinamide is completely atoxic for the test animals.

When injected intraperitoneally into mice at a dose of 3 g./kg., the compound has not notable effect on the central temperature of the animals.

In another series of experiments, the anti-inflammatory properties of the N,N'-bis-substituted succinamide have been characterised. For this purpose, the general quantitative methods of Domenjoz, which consist in the production of inflammatory oedemas by various physicochemical agents, have been resorted to. There have been used, on the one hand, the granuloma test described by R. Meier and co-workers (Experientia, 1950, 6, 469), and on the other hand, the production of oedemas by intraplantar hypodermic injection of bodies such as 5-hydroxy-tryptamine and histamine, a method described by E. Kelemen (British J. Pharmacol., 1957, 12, 28).

(1) On receiving intraperitoneally each day a dose of 1 g./kg. of N,N'-bis-substituted succinamide for 10 days, mice have granulomas whose weight is 20% less than that of the control mice.

(2) When the oedema of the foot caused by the intraplantar injection of 5γ of 5-hydroxy-tryptamine is studied, and immediately before the injection of the inflammatory agent, 1 g./kg. of the N,N'-bis-substituted succinamide is injected intraperitoneally, the oedema is less than that of the control by 59%.

(3) When the injection of the same dose of the N,N'-bis-substituted succinamide is made 6 hours before the injection of the inflammatory agent, the oedema has decreased by 66% with respect to that of the control.

(4) When the same dose of the N,N'-bis-substituted succinamide is injected twice daily with 6 injections in all, the last being given immediately before the injection of the 5-hydroxy-tryptamine, the oedema is decreased by 76% with respect to that of the control.

(5) When the same experimental conditions given in numbers 2, 3 and 4 are used with the same dose of the N,N'-bis-substituted succinamide, but using histamine in a dose of 25γ as the inflammatory agent, the protection of the animal is shown by a decrease of the oedema which is 34%, 31% and 35% respectively.

This antiphlogistic action has been confirmed by the triple reaction of Lewis, obtained on the guinea pig following the intradermal injection of 1/10 cc. of histamine. The N,N'-bis-substituted succinamide protects the animal against histaminic oedema for about 30 to 45 minutes. However, it does not appear that the action of the product involves a property of antihistaminic type, because the product has no effect on the isolated ileum of the guinea pig, contracted by the histamine.

In conclusion, the pharmacological studies show that the succinamide according to the invention is devoid of toxicity to the test animal taken orally and intraperitoneally, and even in large doses. On the other hand, the product is endowed with antiphlogistic and anti-inflammatory properties, as is shown by tests as varied as the consecutive oedema to the formation of a granuloma or the injection of inflammatory agents such as 5-hydroxy-tryptamine and histamine.

*Applications in Human Therapy*

Since the pharmacological tests have shown that the N,N'-bis-substituted succinamide possesses anti-inflammatory and antiphlogistic properties, it has been tried in the clinic as an antirheumatic, in the form of cachets or compressed tablets containing a dose of 0.50 g. It has been administered at a daily dose of 2 to 10 tablets or cachets. Fifteen patients attacked by inflammatory rheumatism, pains of rheumatic type and arthritis, have been so treated. Out of these fifteen cases, 11 very good results and 4 partly positive results have been noted. The following case is cited as an example.

A patient, 42 years of age, engaged in industry sustained in 1954, bimalleolar fracture with considerable displacement caused by a fall on skiing. Two months immobilisation followed and then walking was resumed almost normally, but since, the patient had complained of his ankle, slightly oedematic at night, prolonged walking tired him. Slight improvement was obtained by massage and physiotherapy (short waves, infra-red) and the patient took 2 to 3 g. of aspirin almost regularly except during the holidays where swimming brought an improvement for 2 to 3 months.

The N,N'-bis-substituted succinamide of the present invention was tried (4 cachets per day). Rapid disappearance of the pain and then of the oedema resulted.

I claim:

1. A composition having anti-inflammatory, antiphlogistic and anti-rheumatic properties comprising the compound of the following formula:

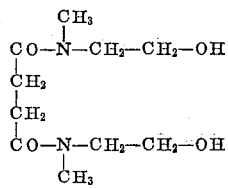

in a dosage unit of up to 600 mg. and a pharmaceutically acceptable carrier for said compound.

2. Process for the treatment of rheumatism and arthritis which comprises administering orally to a human being a compound of the formula:

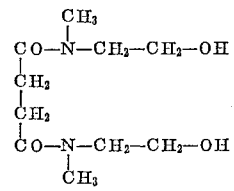

at effective doses up to 600 mg. daily.

3. Process for the treatment of rheumatism and arthritis which comprises administering orally to humans in dosage form from about 200 to 600 mg. per day of a compound of the formula:

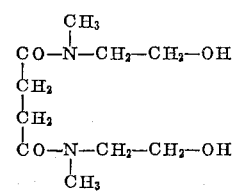

and a pharmaceutically acceptable carrier therefor.

References Cited in the file of this patent

UNITED STATES PATENTS 2,845,452 Morel _____ July 29, 1958
2,851,494 Ehrhart et al. _____ Sept. 9, 1958

OTHER REFERENCES

Chemical Abstracts 47:541b (1953).
Chemical Abstracts, 54:6180e (1960); 53:8699b (1959).